US009171147B2

(12) United States Patent
Logan et al.

(10) Patent No.: US 9,171,147 B2
(45) Date of Patent: Oct. 27, 2015

(54) PROCESS AND SYSTEM FOR STRENGTHENING PASSWORD SECURITY

(71) Applicants: Thomas C. Logan, Tacoma, WA (US);
Michael McIntosh, Kanehoe, HI (US);
Robin G. Balmer, Tacoma, WA (US);
Kevin Howard, Tacoma, WA (US)

(72) Inventors: Thomas C. Logan, Tacoma, WA (US);
Michael McIntosh, Kanehoe, HI (US);
Robin G. Balmer, Tacoma, WA (US);
Kevin Howard, Tacoma, WA (US)

(*) Notice: Subject to any disclaimer, the term of this patent is extended or adjusted under 35 U.S.C. 154(b) by 35 days.

(21) Appl. No.: 13/954,632

(22) Filed: Jul. 30, 2013

(65) Prior Publication Data
US 2014/0040627 A1 Feb. 6, 2014

Related U.S. Application Data

(60) Provisional application No. 61/677,772, filed on Jul. 31, 2012.

(51) Int. Cl.
G06F 21/46 (2013.01)

(52) U.S. Cl.
CPC .................................. *G06F 21/46* (2013.01)

(58) Field of Classification Search
CPC ...... H04L 63/083; H04L 9/3226; G06F 21/46
See application file for complete search history.

(56) References Cited

U.S. PATENT DOCUMENTS

2008/0092216 A1* 4/2008 Kawano et al. ............... 726/5
2012/0027200 A1* 2/2012 Delpuch ....................... 380/28

\* cited by examiner

Primary Examiner — Izunna Okeke
(74) Attorney, Agent, or Firm — Bold IP, PLLC

(57) ABSTRACT

A process and a system that create and encrypt rich formatted passwords that increase password strength and security in some embodiments are disclosed. The process increases password security by converting a set of password tokens and a set of password appearance alterations into a rich formatted password and then encrypting the rich formatted password. The system of some embodiments includes (i) a data converter for assembling a rich formatted password from a data object comprising a set of password tokens and a set of password appearance alterations received at a password creation user interface (UI) of a computing device and (ii) a data encrypter for encrypting rich formatted passwords and decrypting encrypted rich formatted passwords, and (iii) a database for storing and retrieving encrypted rich formatted passwords.

20 Claims, 3 Drawing Sheets

PROCESS AND SYSTEM FOR STRENGTHENING PASSWORD SECURITY

CLAIM OF BENEFIT TO PRIOR APPLICATION

This application claims benefit to U.S. Provisional Patent Application 61/677,772, entitled "A program used To INCREASE THE POWER OF Password and Logon I D Security by building a program called PASSWORD BUILDER," filed Jul. 31, 2012. The U.S. Provisional Patent Application 61/677,772 is incorporated herein by reference.

BACKGROUND

The embodiments herein relate generally to password security, and more particularly to enhancing the strength and security of passwords by altering the appearance of passwords.

Password security is a matter of great importance for most individuals, companies, organizations, government agencies, and any groups or entities that deal with sensitive data (hereafter referred to as "password users" or "users"). Passwords that are weak are easily cracked using any of several known techniques. When passwords are cracked sensitive information is often compromised. Thus, users typically seek to increase password strength. One way to increase password strength is to increase the number of alphanumeric characters, punctuation marks, and other keyboard symbols (hereafter referred to collectively as "password tokens") used in the overall password. Passwords can be case-based (i.e., upper-case, lowercase) which requires a user to input combinations of keyboard keys (i.e., shift+the alphabetical character) in order to input some of the password tokens. Although password strength can be increased by using different cases and increasing the overall number of tokens in the password, most users prefer to use fewer password tokens for ease of use and in order to be able to remember the password when needed. For example, a password that includes 100 tokens, some of mixed case, is both difficult to remember and is cumbersome to use, because it is easy to mistype one or two of the tokens. Taken as a whole, users generally rely on passwords of phrases, names, dates, times, and other such items that do not have any particular significance to the general public, but which have memorable significance in the mind of the user. Thus, many users rely on short passwords, despite the reduced security provided. This is a problem for anyone who maintains the confidence and privacy password-protected information.

In response, there currently exist many requirements and restrictions on passwords that are designed to help increase the security of passwords. These requirements and restrictions vary from website-to-website, computer-to-computer, and device-to-device. The result is that each user must create multiple passwords in order to meet the requirements of each website, computer, and/or device. This makes it difficult for the user to remember the passwords themselves, as well as which password is for which website, computer or device.

Therefore, what is needed is a program that can be integrated into existing login systems and which allows users to create complex, highly secure passwords using memorable text in a rich format, thereby increasing password security.

BRIEF SUMMARY

A process and a system are disclosed in some embodiments of the invention that create and encrypt rich formatted passwords that increase password strength and security. The process of some embodiments creates rich formatted encrypted passwords by converting a set of password tokens and a set of password appearance alterations into a rich formatted password and then encrypting the rich formatted password.

In some embodiments, the system includes (i) a data converter for assembling a rich formatted password from a data object comprising a set of password tokens and a set of password appearance alterations received at a password creation user interface (UI) of a computing device and (ii) a data encrypter for encrypting rich formatted passwords and decrypting encrypted rich formatted passwords, (iii) a database for storing and retrieving encrypted rich formatted passwords, and (iv) a password authenticator for comparing a rich formatted password from a login with a rich formatted password from the database.

BRIEF DESCRIPTION OF THE DRAWINGS

These and other features, aspects and advantages of the present invention will become better understood with regard to the following description, appended claims, and accompanying drawings where:

DETAILED DESCRIPTION

Figure 1:
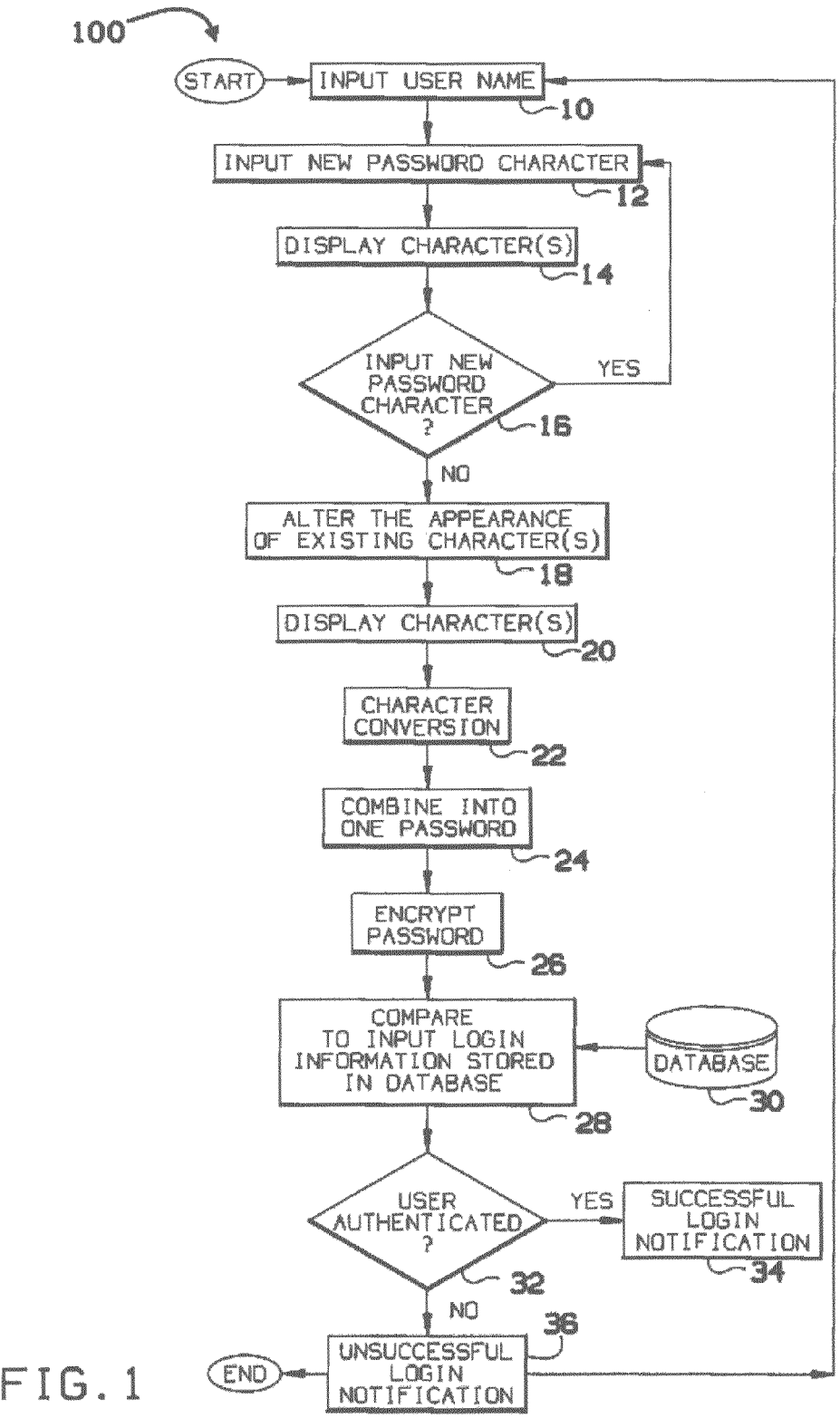
FIG. 1 conceptually illustrates an example process for creating and encrypting rich formatted passwords in some embodiments.

In the following detailed description, several examples and embodiments of the invention are described. However, it will be clear to a person skilled in the art that the invention is not limited to the embodiments set forth and can be adapted for any of several other uses.

A process and a system are disclosed in some embodiments of the invention that create and encrypt rich formatted passwords that increase password strength and security. The process of some embodiments creates rich formatted encrypted passwords by converting a set of password tokens and a set of password appearance alterations into a rich formatted password and then encrypting the rich formatted password. The process of some embodiments further includes authenticating a user login by comparing the password tokens and appearance alterations of the rich formatted password with a set of password tokens and a set of appearance alterations received at login.

In some embodiments of the process and system, a password builder program allows users to create simple, more easily remembered passwords, while greatly improving the security of their passwords. One way this is accomplished is by giving the user a visual representation of their password. It is much easier to remember the password "Free", than it is to remember a password such as "Freed0m! 1968". However, the password builder program renders the first password more secure than the latter. For instance, an 8-character Reverse Image Technologies alphanumeric password (unaltered) is more secure than a 38-character conventional alphanumeric password; and an 8-character Reverse Image Technologies extended password is more secure than a 37-character conventional extended password. Because of the ability to turn short easy-to-remember passwords into complex highly secure passwords, the password builder of some embodiments is the perfect utility for integrating into any operating system as well as online websites.

Several more detailed embodiments are described in the sections below. Section I describes a process for increasing password security and strength without increasing password complexity by creating and encrypting a rich formatted password from a set of appearance alterations applied to one or more of the characters of the password.

DEFINITIONS

"Rich Formatted": A generic association of character modifications with characters, not to be confused with or limited to Rich Text Format.

"Password Tokens": Alphanumeric characters, punctuation marks, and other keyboard symbols.

"Password users" or "Users": Individuals, companies, organizations, government agencies, and any groups or entities that deal with sensitive data.

"Salt": Is random data that is used as an additional input to a one-way function that hashes a password or passphrase.

"Identification number": A number used to store the parameters for the map converting the input password and input alterations into the lengthy plain text output password.

1. Process for Increasing Password Security and Strength

FIG. 1 conceptually illustrates an example process for creating and encrypting rich formatted passwords in some embodiments. In some embodiments, the process 100 is implemented as a password builder computer software program that runs on a computing device. In some embodiments, the password builder program comprises a user interface (UI) for password creation. The computing device can be a desktop computer, a laptop computer, and any of several mobile computing devices, including a tablet computing device, a mobile phone, and a mobile application device. The process 100 is described by reference to FIG. 3, which conceptually illustrates an example of a rich formatted password 300.

In some embodiments, the process 100 starts when a user accesses the UI for password creation and tries to login to a system to create and encrypt rich formatted passwords. In some embodiments, the system for creating and encrypting rich formatted passwords is incorporated into a larger system for engaging in activities or performing operations unrelated to creating and encrypting rich formatted passwords. For instance, the user may be accessing a bank account web portal that allows the user to perform banking activities online after setting up an account password and logging onto the banking system. In these embodiments, the UI for password creation can be integrated into existing UI's of the system. For example, the UI for password creation may be integrated into a graphical user interface (GUI) of a web server that provides access to an online ecommerce website of a commercial vendor offering products for sale over the Internet. The UI for password creation can be integrated with existing systems at a functional level or can be deployed with an associated GUI. In either case, the UI for password creation allows the user to enter a password and alter its characters in order to strengthen the security of the password.

As shown, the process first receives (at 10) the input user name that the system associates with the user. In some embodiments, the user already has a username that is established, while in other embodiments, the user is inputting a new username for using the system.

After the username is input, the process 100 receives (at 12) an input for a new password character. In some embodiments, the new password character comprises a set of tokens comprising one or more of alphabetical characters, numbers, punctuation marks, and symbols. In some embodiments, the process performs successive steps after a single token is input. In other embodiments, the process accepts a plurality of input tokens before performing successive steps. For example, a user may copy (from a text program, such as a word processing application) a plain text phrase having several tokens and paste the several tokens of the plain text phrase in a password input field of the UI for password creation.

Regardless of the number of tokens input for the new password, in some embodiments, the process 100 displays (at 14) the characters as they are input by the user. The process then determines (at 16) whether additional new password characters are expected to be input. If the process determines that no new characters are going to be input, the process transitions to 18, described below. On the other hand, if the process expects additional forthcoming characters, the process transitions back to receiving (at 12) the user input of the new password character, as described above. In some embodiments, the process receives a signal that password character entry is complete. For example, the process may receive an input associated with a particular GUI button (e.g., an OK button) or a particular keyboard key (e.g., the enter key) that signals the end of new password character input.

Figure 3:
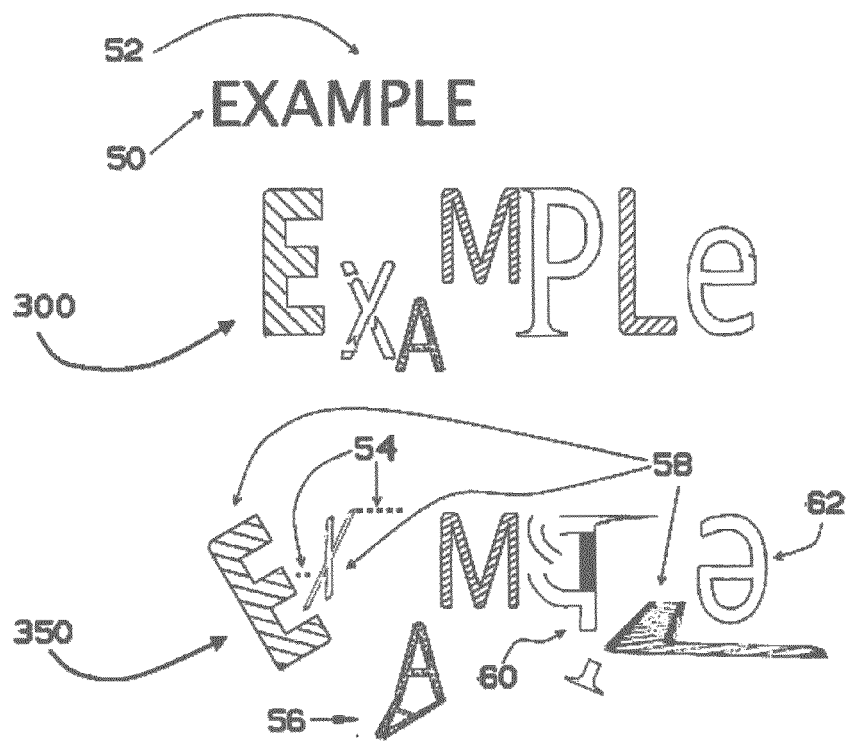
FIG. 3 conceptually illustrates examples of a rich formatted password.

An input password is exemplified in FIG. 3, which conceptually illustrates two examples of appearance changes to the standard password 50 resulting in a rich formatted password in each example, 300 and 350. As shown, a standard input password 50 comprises seven tokens 52 (i.e., "E", "X", "A", "M", "P", "L", "E"). The password 50 is a character-based password that has an appearance typical of most computer text (e.g., standard sizing, standard spacing, consistent font, consistent stylization, etc.). Although variations exist in the visual appearance of characters used between different password creation systems, password creation programs typically display a standard appearance for all tokens of a single password. Alternatively, no tokens are displayed in some systems because the tokens are hidden by place markers, such as asterisks marks.

Referring back to FIG. 1, when the process 100 determines (at 16) that the user has finished inputting new password characters, the process then receives (at 18) alterations of the appearance of the existing characters of the new password. In some embodiments, the alterations comprise appearance changes to one or more of a font in which the password tokens are displayed, the display size of the password tokens, the color in which the tokens are displayed, the orientation at which the password tokens are arranged with respect to a font style and/or a particular display, the horizontal and/or vertical position of a token with respect to a baseline for the password and spacing rules that constrain the positioning of the individual tokens, the degree of opacity of the tokens, the integrity of various parts of the tokens, the case of the tokens, elements corresponding to the tokens (e.g. shadows, etc), and any of several other appearance changes that can be applied to displayed password characters, numbers, punctuation marks, symbols, diacritical marks, and other such graphical tokens.

The manner of making alterations to the appearance of the password characters is functional performed in any of several well-known manners of making visual display selections and/or setting selections of parameter options. For instance, a graphical user interface (GUI) may include a set of GUI tools for manipulating the appearance of the password. A set of manipulations can be based on user inputs in the form of one or more of mouse pointer interactions, keyboard "hot key" interactions, drawing pad pointer interactions, and gestural interactions by the user (e.g., a finger swipe to move a selected password token, a double finger widening to scale a selected password token, etc.) onto a touch screen display capable of receiving gestural touch inputs.

By way of example, the password builder program that implements the process 100 may receive a set of password appearance alterations based on keyboard inputs by a user. Such keyboard inputs, or "hot key" selections, are configurable to any set of keys or key combinations the user wishes to use for the manipulation of the password appearance. For instance, the user may set a first key combination comprising the Alt key and any of the four arrow keys of standard computer keyboard, and designate the first key combination for operations that modify any password token in the direction of the arrow key including right, left, and upside down or reversed (e.g., the up arrow key can be designated to reverse the password character token). A second key combination comprising the Shift key and the right arrow key could be designated for mirroring any selected password token. A third key combination comprising the Shift key and the left arrow key could be used to toggle a shadow for a selected password token (e.g., toggling the display of a token's shadow on and off for each depressing of the third key combination). A fourth key combination comprising the Shift key and the up arrow key may be designated for tilting a password token. A fifth key combination comprising the Shift key and the down arrow key could be designated, for example, to shatter the password token to appear in fragmented form.

The key combinations described above could also be applied to any number of selected token password elements to perform the same appearance alteration each of the selected tokens. For example, by highlighting the entire password and depressing the Shift key and the right arrow key, the password builder program may apply a mirrored appearance to each of the highlighted password tokens.

A key aspect of the password builder program is that users can obtain a high level of password security and strength without having to remember complex passwords. Because of the capabilities, users are still able to create really complex passwords that have to be remembered. This is great for security purposes, but there is no limit to password complexity. As a practical matter, password complexity can quickly become overwhelming for a person to remember the password, causing the person to routinely request a reset of the password. This defeats the point of passwords used to securitize sensitive digital data. And the beneficial features can be extended by incorporating the process 100, implemented in the password builder program, into other systems. In this way, the password builder program could be applied to bank codes, debit and/or credit card passwords, identification codes (e.g., social security number), personal identification numbers (PINs), and other personal identifiers (e.g., work login passwords, time-in-out numbers, etc.). The above examples are intended to illustrate the function and operation of the password builder with respect to changing the appearance of passwords, and are not intended in any way to be limiting, because the foregoing examples represent only a small sample of the possibilities for adding layers of security to passwords.

In this manner, the password builder program goes beyond current methods for securitizing passwords by allowing the user to incorporate one or more additional security layers on top of a fundamental encryption layer. Thus, any user of the password builder program is able to build, design, and encrypt a unique ID and/or password and, as part of that password, add a layer of appearance alterations, including one or more of character reversal, shadowing, tilting, mirroring, and shattering the characters for a fragmented appearance. Moreover, the password builder program can be incorporated into any digital password creation or authentication system and into any computer or electronic device that requires a login ID and/or password.

Referring back to the process 100, after the process receives (at 18) one or more appearance alterations, the process then displays (at 20) the appearance alterations of the rich formatted password. The display appearances of two example rich formatted passwords, 300 and 350, are next described by reference to FIG. 3.

The first example of appearance changes shown by the tokens 52 of the rich formatted password 300 comprises several different appearance changes to the individual tokens 52 of the standard input password 50. For instance, the appearance of the tokens 52 in the input password 50 are consistent in font, size, spacing, case, and structural integrity while the appearance of the corresponding tokens in the rich formatted password 300 differ considerably in font, size, spacing, case, and structural integrity. Specifically, the "E" token appears to be thicker than other tokens, the "X" token is fragmented into several smaller constituent parts, the "A" token appears with a different color (as illustrated in this example by its relatively darker appearance) the "M" token is vertically spaced high above the password's baseline, the "P" token includes a different font (i.e., a serif-based font, while the other tokens appear in sans serif fonts), the "L" token appears shaded, and the "E" token appears in lower case. Thus, ordinary passwords, which are often weakly protected by only a single layer of protection (i.e., encryption), benefit from increased security and strength when the appearance of the password is used as a second layer of protection.

In the second example of a rich formatted password 350 shown in FIG. 3, many of the individual tokens 52 are shown with two or more appearances changes. In particular, the "E" token includes the increased thickness as in the rich formatted password 300. However, the "E" token further includes an orientation change, such that the "E" token appears with an exaggerated backward slanted orientation. Additional orientation changes 58 are exemplified in the rich formatted password 350 shown in this figure. For instance, the "X" token no longer appears fragmented, but appears angled and twisted about an axis of rotation. Likewise, the "L" token appears to be laying flat instead of being displayed in an upright appearance as in the rich formatted password 300. Other appearance changes include spacing overrides 54 between some of the individual tokens (i.e., very slight space between the "E" and "X" tokens, but great space between the "X" and "A" tokens), the appearance of virtual shadow elements 56 corresponding to tokens (i.e., the "A" token seems to have a shadow), as well as a few tokens that include three or more appearance changes, specifically, the "P" token 60 with mirrored orientation, exaggerated serif/font, and fragmentation of the token, and the "E" token 62 includes a different case, a mirrored orientation, and an appearance of being upside down.

Although the example rich formatted passwords 300 and 350 show several appearance changes, there are many additional appearances that can be incorporated into the system. Over time, different alterations will be added to increase the variations and levels of security that can be achieved. Thus, these examples show that the password builder process 100 allows the user to employ simpler passwords that are easier to remember, while maintaining a high level of security.

Referring back to FIG. 1, the process 100 next performs (at 22) character conversion producing a single lengthy password (at 24). In some embodiments, the character conversion takes each character of the input password and the alterations corresponding to this character to produce one or more characters of the output password. In other embodiments the input password and character alterations are in their entirety converted into a lengthy output password (24). In some embodiments, the characters of the input password are represented as a number, the alterations are represented as a number, and these numbers are entered as keys into a hash table, the output of which corresponds to the output password. The parameters for this hash table can be parsed out of an identification number. The process then encrypts the output password (at 26). In some embodiments, the process encrypts the password using a hash via PBKDF2 algorithm, with SHA512 and 5000 iterations.

In some embodiments, the process compares (at 28) the input login information stored in the database 30. The process 100 next determines (at 32) whether a user is authenticated. If the user is affirmatively authenticated, the process transitions to 34 to provide a notification of successful login (at 34). On the other hand, if the user is not affirmatively authenticated, then the process sends an unsuccessful login notification (at 36). In some embodiments, the process continues at the beginning by allowing the user to input a user name. The subsequent steps and operations are described above. At some point, the number of attempts to login times out, or hits a threshold number, after which the process 100 ends.

While the process 100 illustrates several process steps for altering the appearance of password tokens to enhance the strength and security of underlying passwords, the next section describes embodiments of a system for creating and encrypting rich formatted passwords that increase password strength and security. In some embodiments, the system includes (i) a data converter and encrypter for assembling a rich formatted password from a set of password tokens and a set of password appearance alterations received at a password creation user interface (UI) of a computing device and encrypting the rich formatted password, and for decrypting an encrypted password into a rich formatted password and disassembling the rich formatted password into a set of password tokens and a set of password appearance alterations, (ii) a database for storing and retrieving encrypted rich formatted passwords, and (iii) a password authentication module for comparing the set of decrypted and converted password tokens and password appearance alterations with the sets of assembled password tokens and password appearance alterations.

2. System for Increasing Password Security and Strength

Figure 2:
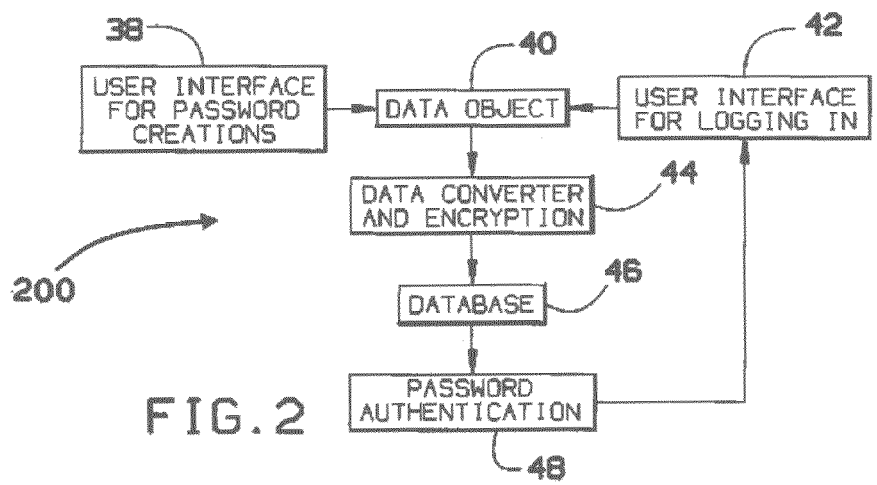
FIG. 2 conceptually illustrates a schematic diagram of an example system for creating, encrypting, storing and authenticating rich formatted passwords in some embodiments.

FIG. 2 conceptually illustrates a schematic diagram of an example system 200 for creating and encrypting rich formatted passwords in some embodiments. As shown, the example system 200 includes (i) a data converter 44 for assembling a rich formatted password from a data object 40 comprising a set of password tokens and a set of password appearance alterations received at a password creation user interface (UI) 38 of a computing device and (ii) a data encrypter 44 for encrypting rich formatted passwords and decrypting encrypted rich formatted passwords, (iii) a database 46 for storing and retrieving encrypted rich formatted passwords, and (iv) a password authenticator 48 for comparing a rich formatted password from a login with a rich formatted password from the database. In some embodiments, a UI for logging in 42 is also provided.

The password creation user interface 38 of some embodiments allows the user to enter a number of tokens of a password and alter the appearance of the tokens in order to strengthen the security of the password. As noted above, the appearance alterations include any type of alteration that can be made to the appearance of the password tokens, including (but not limited to) changing the font in which the password tokens are displayed, the display size of the password tokens, the color in which the tokens are displayed, the orientation at which the password tokens are arranged with respect to a font style and/or a particular display, the horizontal and/or vertical position of a token with respect to a baseline for the password and spacing rules that constrain the positioning of the individual tokens, the degree of opacity of the tokens, the integrity of various parts of the tokens, the case of the tokens, elements corresponding to the tokens (e.g. shadows, etc), and any of several other appearance changes that can be applied to displayed password characters, numbers, punctuation marks, symbols, diacritical marks, and other such graphical tokens. The result is a rich-text password.

In some embodiments, the data converter 44 is a client-side tool used when the user submits their password. Due to the client-side nature, it achieves high levels of security. As described above by reference to the process 100 in FIG. 1, the password will first be processed and converted/translated into a lengthy plain-text password. This new password/key is then converted to a hash-encrypted password. Any of several well known hashing algorithms can be used, including conversion to a hash using the PBKDF2 algorithm, with SHA512 and 5000 iterations.

In some embodiments, the hashed password/key is the new data object 40 and is then stored in the database 46. The database 46 can be either on the server or operating system database. The database 46 of some embodiments stores, in addition to hash data object 40, the user's information including username, the input password encrypted in the form of a hashed key, and the appearance alterations associated with the password, with the appearance alterations also encrypted in the form of a hashed key.

The user interface for logging in 42 provides a UI for users who need to log into a system by providing at least a username and password. In some embodiments, the password interface of the UI for logging in is similar to the password creation UI 38. In order to be successfully authenticated, the user of the UI for logging in must provide a set of password tokens and a set of alterations that match the password tokens of the input password and the set of alterations set to the tokens in creating the enhanced rich formatted password.

When a user enters in the set of password tokens and the corresponding set of alterations to the password tokens, the user's credentials are checked against the keys saved in the database 46. Because the user's credentials are encrypted, the user's username, password, and set of alterations are never sent over the Internet in plain text. In some embodiments, the entire authentication process is performed on the client side to preserve the high levels of security gone through with creating their password. The user's credentials are passed through the data converter 44 of some embodiments and then matched with retrieved keys previously saved in the database 46. In some embodiments, a successful match is a successful login. In other embodiments, a successful match does not automatically result in a successfully login. Instead, some embodiments require a third layer of password security authentication.

In some embodiments, even after the username, password, and set of alterations have been validated, the system requests input of a PIN associated with the password. The requested PIN represents a third layer of security in the system. Although not shown in FIG. 2, a PIN authenticator receives an encrypted PIN based on an input PIN entered by a user and encrypted for transmission. The received encrypted PIN of some embodiments is then compared to a PIN corresponding to the data object from the database. If the received PIN matches the PIN in the database, the system validates the login at the third layer of security. In this way, the user of the system can obtain enhanced password security and strength without expanding the number of tokens used in the password.

3. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
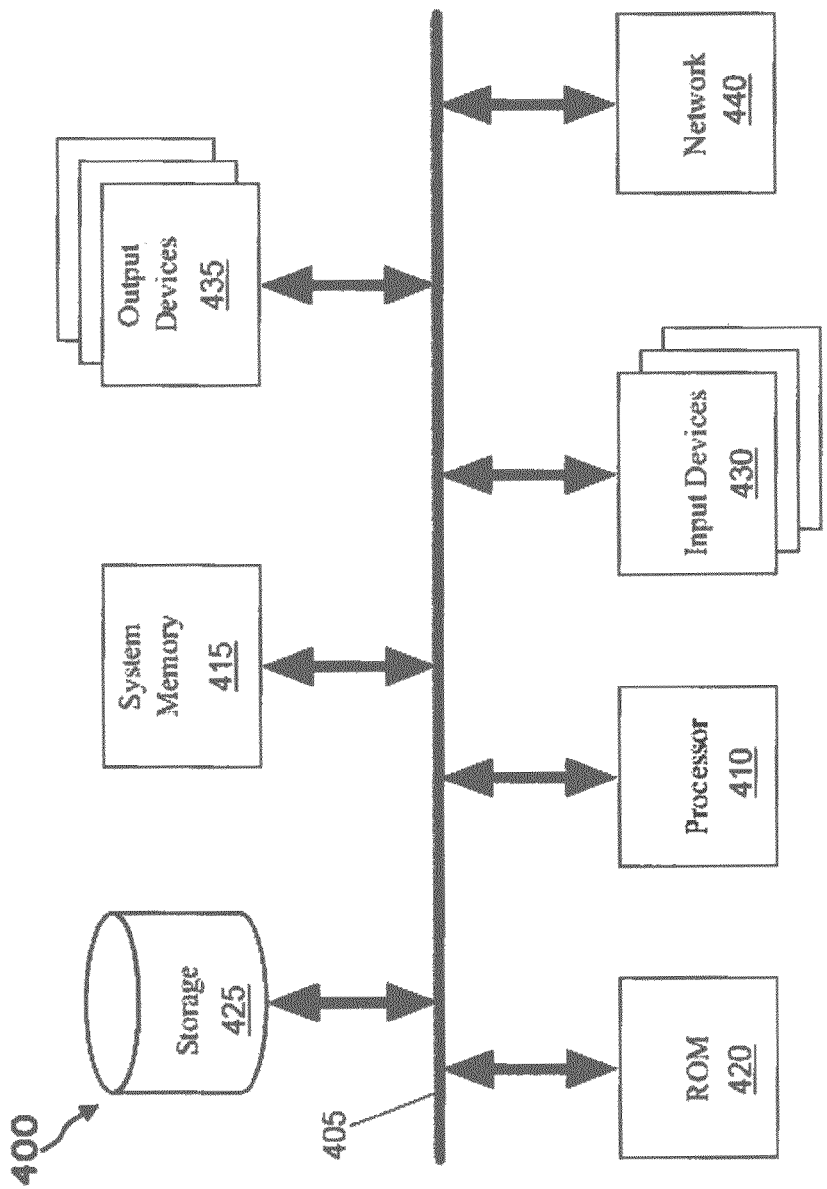
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an Intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, many of the figures illustrate example passwords with alphabet characters. However, a variety of other types of password tokens can be used in passwords, including numbers, punctuation marks, diacritical marks, symbols, and other such graphical elements. Thus, one of ordinary skill in the art would understand that the invention is not to be limited by the foregoing illustrative details and examples, but rather is to be defined by the appended claims. Additionally, the types of appearance changes are not limited in any way by the foregoing details and examples, but is instead are understood to include any type of appearance change that can be created from password tokens, in whole or in part as a person skilled in the art would understand.

Also, FIG. 2 illustrates an example schematic of a system for creating rich formatted passwords. The specific operational units associated with this schematic may not be organized in the system with exactly the same operational and functional relationships to other operational units. For instance, in order not to obscure the schematic shown in FIG. 2 with unnecessary detail, certain system functional and/or operational units have not been illustrated, including, for example, any communication and network management modules, administrative modules, database management systems, and a variety of other such functional units.

In addition, FIG. 1 conceptually illustrates a process. The specific operations of this process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a program which when executed by at least one processing unit of a computing device strengthens password security, said program comprising instructions for:
    receiving one or more input characters from one or more users for an input password, wherein the input characters are selected from a plurality of designated characters;
    receiving at least two input display appearance alterations from one or more users, wherein at least two different input display appearance alterations alter at least two different input characters of the input password in different ways, each alteration being one of the following: reversing, rotating, mirroring, shadowing, tilting, shattering, font, color, size, bolding, underlining, italicizing, outline color, spacing between other input characters, transparency, opacity, adding or removing serifs, moving left or right, moving up or down, creating tile, or changing tile;
    accessing an identification number; and
    generating an output password from a designated set of output characters based on the input characters of the input password and the set of input display appearance alterations, using parameters parsed from the identification number.

2. The non-transitory computer readable medium of claim 1, wherein the program further comprises a set of instructions for converting the output password into a hash-encrypted password.

3. The non-transitory computer readable medium of claim 2, wherein the program further comprises a set of instructions for storing the hash-encrypted password to perform subsequent password authentication.

4. The non-transitory computer readable medium of claim 1, wherein the plurality of designated characters comprises a plurality of alphanumeric ASCII characters.

5. The non-transitory computer readable medium of claim 1, wherein the plurality of designated characters comprises a plurality of alphanumeric ASCII characters and a plurality of ASCII punctuation characters.

6. The non-transitory computer readable medium of claim 1, wherein the plurality of designated characters comprises one or more sets of representational characters comprising: emoticons and other keyboard symbol codes used in text messaging.

7. A system for strengthening password security, said system comprising:
    a password builder computer application program that runs on top of an operating system of a computing device comprising a processor, a memory, and a display device, wherein said display device comprises a set of graphical display instruction sets capable of displaying a user interface (UI) for password creations when said password builder computer application program is executing on the processor, wherein said memory comprises a volatile storage capable of storing one or more input characters from one or more users which make up an input password and one or more input display appearance alterations received by one or more users of at least one input character received by the password builder program, wherein said password builder computer application program comprises sets of instructions for (i) applying one or more input display appearance alterations from one or more users to one or more input characters within an input password (ii) accessing an identification number, and (iii) generating an output password based on the input password characters and the input display appearance alterations, using parameters parsed from the identification number; and
    a database server comprising a database management system and a database storage, said database storage for storing at least one of (i) one or more input characters of the input password and the associated input display appearance alterations, (ii) the output password, and (iii) an encrypted password created by the password builder program.

8. The system for strengthening password security of claim 7, said system further comprising a password authentication module that validates a user logon operation by decrypting the encrypted password created by the password builder program to receive the output password and comparing the output password to each output password stored in the database.

9. The non-transitory computer readable medium of claim 1, wherein the program further comprises sets of instructions for:
    applying the input display appearance alterations to the corresponding input characters of the input password; and
    displaying a resulting formatted password comprising the set of input characters and the input display appearance alterations applied to the corresponding input characters.

10. The non-transitory computer readable medium of claim 9, wherein the program further comprises sets of instructions for:

Converting the formatted password to a set of UNICODE characters; and

Gathering the output password from the set of UNICODE characters.

11. The non-transitory computer readable medium of claim 1, wherein password security for each of the input password and the output password is based on at least one of: (i) password length, (ii) a quantity of source characters from which password characters of the password are derived, and (iii) a level of uniformity in a distribution of a mixture of source characters used in the password.

12. The non-transitory computer readable medium of claim 11, wherein password security of the output password is more secure than password security of the input password.

13. The non-transitory computer readable medium of claim 2, wherein the set of instructions for converting the output password into a hash-encrypted password comprises a set of instructions for salting the output password with a non-random key.

14. The non-transitory computer readable medium of claim 1, wherein the translation of the input characters and input display appearance alterations into an output password depends in part on one or more characters associated with a specific instance of the medium.

15. A non-transitory computer readable medium storing a program which when executed by at least one processing unit of a computing device strengthens password security, said program comprising sets of instructions for:

receiving one or more input characters for an input password from one or more users, wherein the input characters are selected from a plurality of designated characters;

receiving at least two input display appearance alterations from one or more users, wherein at least two different input display appearance alterations alter at least two different input characters of the input password in different ways, each alteration being one of the following: reversing, rotating, mirroring, shadowing, tilting, shattering, font, color, size, bolding, underlining, italicizing, outline color, spacing between other input characters, transparency, opacity, adding or removing serifs, moving left or right, moving up or down, creating tile, or changing tile;

accessing an identification number; and generating an output password from a designated set of output characters, wherein the generated output password is based on one or more input characters of the input password and one or more input display appearance modifications, wherein password security of the generated output password is stronger than password security of the input password, using parameters parsed from the identification number.

16. The non-transitory computer readable medium of claim 15, wherein password security for each of the input password and the output password is based on at least one of: (i) password length, (ii) a quantity of source characters from which password characters of the password are derived, and (iii) a level of uniformity in a distribution of a mixture of source characters used in the password.

17. The non-transitory computer readable medium of claim 16, wherein password security of the output password is more secure than password security of the input password.

18. The non-transitory computer readable medium of claim 15, wherein the program further comprises sets of instructions for:

applying the input display character modifications to the corresponding input characters of the input password; and displaying the input password after applying the input display character modifications with a visual appearance that is unchanged from a visual appearance of the input password before applying the character modifications.

19. The non-transitory computer readable medium of claim 15, wherein the set of instructions for generating the output password comprises sets of instructions for:

converting the input password and character modifications into the output password; and salting the conversion with a non-random key.

20. The non-transitory computer readable medium of claim 3 wherein the password authentication is completed by validating a user logon including: (i) a set of logon characters that match the set of input characters and (ii) one or more logon display appearance alterations that match one or more input display appearance alterations.

* * * * *